United States Patent
Loren et al.

(10) Patent No.: US 11,726,162 B2
(45) Date of Patent: Aug. 15, 2023

(54) SYSTEM AND METHOD FOR NEIGHBOR DIRECTION AND RELATIVE VELOCITY DETERMINATION VIA DOPPLER NULLING TECHNIQUES

(71) Applicant: Rockwell Collins, Inc., Cedar Rapids, IA (US)

(72) Inventors: Eric J. Loren, North Liberty, IA (US); William B. Sorsby, Cedar Rapids, IA (US); Tj T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 288 days.

(21) Appl. No.: 17/233,107

(22) Filed: Apr. 16, 2021

(65) Prior Publication Data
US 2022/0334211 A1    Oct. 20, 2022

(51) Int. Cl.
*G01S 13/62*    (2006.01)
*G01S 5/00*    (2006.01)
*G01S 13/58*    (2006.01)

(52) U.S. Cl.
CPC .......... *G01S 5/0027* (2013.01); *G01S 13/583* (2013.01); *G01S 13/62* (2013.01)

(58) Field of Classification Search
CPC ....... G01S 5/0027; G01S 13/583; G01S 13/62
See application file for complete search history.

(56) References Cited

U.S. PATENT DOCUMENTS

| | | |
|---|---|---|
| 4,134,113 A | 1/1979 | Powell |
| 4,399,531 A | 8/1983 | Grande et al. |
| 4,806,934 A | 2/1989 | Magoon |
| 5,835,482 A | 11/1998 | Allen |
| 5,898,902 A | 4/1999 | Tuzov |
| 6,072,425 A | 6/2000 | Vopat |
| 6,115,394 A | 9/2000 | Balachandran et al. |

(Continued)

FOREIGN PATENT DOCUMENTS

| | | |
|---|---|---|
| CN | 101330448 A | 12/2008 |
| CN | 101465793 A | 6/2009 |

(Continued)

OTHER PUBLICATIONS

U.S. Appl. No. 17/408,156, filed Aug. 20, 2021, Tj T. Kwon.

(Continued)

*Primary Examiner* — Keith Ferguson
(74) *Attorney, Agent, or Firm* — Suiter Swantz pc llo

(57) ABSTRACT

A system and method for frequency offset determination in a MANET via Doppler nulling techniques is disclosed. In embodiments, a receiving (Rx) node of the network monitors a transmitting (Tx) node of the network, which scans through a range or set of Doppler nulling angles adjusting its transmitting frequency to resolve Doppler frequency offset at each angle, the Doppler frequency shift resulting from the motion of the Tx node relative to the Rx node. The Rx node detects the net frequency shift at each nulling direction and can thereby determine frequency shift points (FSP) indicative of the relative velocity vector between the Tx and Rx nodes. If the set of Doppler nulling angles is known to it, the Rx node can determine frequency shift profiles based on the FSPs, and derive therefrom the relative velocity and angular direction of motion between the Tx and Rx nodes.

15 Claims, 7 Drawing Sheets

(56) References Cited

U.S. PATENT DOCUMENTS

| | | |
|---|---|---|
| 6,195,403 B1 | 2/2001 | Anderson et al. |
| 6,496,940 B1 | 12/2002 | Horst et al. |
| 6,662,229 B2 | 12/2003 | Passman et al. |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,299,013 B2 | 11/2007 | Rotta et al. |
| 7,417,948 B2 | 8/2008 | Sjöblom |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,036,224 B2 | 10/2011 | Axelsson et al. |
| 8,159,954 B2 | 4/2012 | Larsson et al. |
| 8,218,550 B2 | 7/2012 | Axelsson et al. |
| 8,223,660 B2 | 7/2012 | Allan et al. |
| 8,341,289 B2 | 12/2012 | Hellhake et al. |
| 8,490,175 B2 | 7/2013 | Barton et al. |
| 8,553,560 B2 | 10/2013 | Axelsson et al. |
| 8,630,291 B2 | 1/2014 | Shaffer et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,867,427 B2 | 10/2014 | Taori et al. |
| 8,913,543 B2 | 12/2014 | Zainaldin |
| 8,942,197 B2 | 1/2015 | Rudnick et al. |
| 8,964,739 B1 | 2/2015 | Wisehart |
| 9,179,475 B2 | 11/2015 | Koleszar et al. |
| 9,246,795 B2 | 1/2016 | Madaiah et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,435,884 B2 | 9/2016 | Inoue |
| 9,516,513 B2 | 12/2016 | Saegrov et al. |
| 9,544,162 B2 | 1/2017 | Vasseur et al. |
| 9,628,285 B2 | 4/2017 | Császár |
| 9,713,061 B2 | 7/2017 | Ruiz et al. |
| 9,858,822 B1 | 1/2018 | Gentry |
| 9,979,635 B2 | 5/2018 | Hellhake et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,257,655 B2 | 4/2019 | Cody |
| 10,382,897 B1 | 8/2019 | Lanes et al. |
| 10,455,521 B2 | 10/2019 | Hudson et al. |
| 10,484,837 B2 | 11/2019 | Navalekar et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,785,672 B2 | 9/2020 | Kwan et al. |
| 10,798,053 B2 | 10/2020 | Nolan et al. |
| 10,873,429 B1 | 12/2020 | Kwon et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,082,324 B2 | 8/2021 | Ramanathan et al. |
| 11,129,078 B2 | 9/2021 | Yates et al. |
| 11,290,942 B2 | 3/2022 | Kwon et al. |
| 11,528,675 B2 | 12/2022 | Nagaraja et al. |
| 2002/0018448 A1 | 2/2002 | Amis et al. |
| 2003/0151513 A1 | 8/2003 | Herrmann et al. |
| 2004/0028016 A1 | 2/2004 | Billhartz |
| 2004/0213239 A1 | 10/2004 | Lin et al. |
| 2004/0246902 A1 | 12/2004 | Weinstein et al. |
| 2006/0010170 A1 | 1/2006 | Lashley et al. |
| 2006/0056421 A1 | 3/2006 | Zaki |
| 2007/0097880 A1 | 5/2007 | Rajsic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0290572 A1 | 11/2009 | Gonia et al. |
| 2010/0074101 A1 | 3/2010 | Skalecki et al. |
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2013/0006834 A1 | 1/2013 | Waelbroeck et al. |
| 2013/0069834 A1 | 3/2013 | Duerksen |
| 2013/0100942 A1 | 4/2013 | Rudnick et al. |
| 2013/0195017 A1 | 8/2013 | Jamadagni et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2015/0010153 A1 | 1/2015 | Robertson |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2016/0139241 A1 | 5/2016 | Holz et al. |
| 2016/0150465 A1 | 5/2016 | Jung et al. |
| 2016/0189381 A1 | 6/2016 | Rhoads |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0198351 A1 | 6/2022 | Beaurepaire et al. |
| 2023/0057666 A1 | 2/2023 | Kwon et al. |

FOREIGN PATENT DOCUMENTS

| | | |
|---|---|---|
| CN | 101330448 B | 12/2010 |
| CN | 101465793 B | 2/2011 |
| CN | 101686179 B | 1/2013 |
| CN | 103067286 B | 6/2016 |

(56) References Cited

FOREIGN PATENT DOCUMENTS

| | | | |
|---|---|---|---|
| CN | 107645417 A | 1/2018 | |
| CN | 110234147 A | 9/2019 | |
| DE | 102010010935 A1 | 9/2011 | |
| EP | 0908022 A2 | 4/1999 | |
| EP | 1912392 A2 | 4/2008 | |
| EP | 2743726 A1 * | 6/2014 | ............ G01S 11/06 |
| EP | 2743726 A1 | 6/2014 | |
| EP | 2466964 B1 | 12/2017 | |
| EP | 3026961 B1 | 8/2020 | |
| GB | 2542491 A | 3/2017 | |
| GB | 2568122 B | 11/2019 | |
| JP | 4290684 B2 | 7/2009 | |
| JP | 5164157 B2 | 3/2013 | |
| KR | 1020040107702 A | 12/2004 | |
| KR | 100568976 B1 | 4/2006 | |
| KR | 1020060078814 A | 7/2006 | |
| KR | 1020160071964 A | 6/2016 | |
| WO | 2008157609 A3 | 3/2009 | |
| WO | 2012062091 A1 | 5/2012 | |
| WO | 2012165938 A1 | 12/2012 | |
| WO | 2015114077 A1 | 8/2015 | |
| WO | 2015143604 A1 | 10/2015 | |
| WO | 2017101575 A1 | 6/2017 | |
| WO | 2018077864 A1 | 5/2018 | |
| WO | 2019045767 A1 | 3/2019 | |
| WO | 2020165627 A1 | 8/2020 | |
| WO | 2021251902 A1 | 12/2021 | |
| WO | 2022221429 A1 | 10/2022 | |

OTHER PUBLICATIONS

U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
U.S. Appl. No. 17/233,107, filed Apr. 16, 2021, Eric J. Loren.
Martorella, M. et al., Ground Moving Target Imaging via SDAP-ISAR Processing: Review and New Trends. Sensors 2021, 21, 2391. https://doi.org/10.3390/s21072391.
Yi et al., "Passive Clustering in Ad Hoc Networks (PC)", URL: https://tools.ietf.org/html/draft-yi-manet-pc-00, Nov. 14, 2001, 31 pages.
Extended Search Report for European Application No. 21188737.7 dated Dec. 10, 2021, 8 pages.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
U.S. Appl. No. 16/987,671, filed Aug. 7, 2021, Kwon et al.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Yi et al., "Passive Clustering in Ad Hoc Networks (PC)", URL: https://tools.ietf,org/html/drafts-yi-manet-pc-00, Nov. 14, 2001, 31 pages.

* cited by examiner

SYSTEM AND METHOD FOR NEIGHBOR DIRECTION AND RELATIVE VELOCITY DETERMINATION VIA DOPPLER NULLING TECHNIQUES

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but this future has not as yet been realized. In addition to topology factors, fast-moving platforms (e.g., communications nodes moving relative to each other) experience a frequency Doppler shift (e.g., offset) due to the relative radial velocity between each set of nodes. This frequency Doppler shift complicates the tradeoffs with respect to, e.g., sensitivity, response time, and/or resource utilization that must be made for reception processing. Further, clock frequency errors also contribute to net signal frequency offsets such that determining relative velocity based on signal frequency shift is not always straightforward.

SUMMARY

A receiving (Rx) communications node of a multi-node communications network is disclosed. In embodiments, the Rx node includes a communications interface and antenna elements. The Rx node includes a controller for monitoring a transmitting (Tx) node of the network. The Tx node scans through a range or set of Doppler nulling angles (e.g., nulling directions) according to a Doppler nulling protocol, adjusting its transmit frequency to resolve at each nulling angle a Doppler frequency offset associated with the relative motion (e.g., including a velocity vector and angular direction) between the Tx and Rx nodes. Based on the net frequency shift detected by the Rx node at each Doppler nulling angle, the Rx node determines frequency shift points (FSP), corresponding to each nulling angle and to the associated net frequency shift, the set of FSPs indicative of a magnitude of the relative radial velocity between the Tx and Rx nodes.

In some embodiments, the magnitude of the relative radial velocity includes a maximum and minimum radial velocity between the Tx and Rx nodes, e.g., a relative maximum/minimum for the range of nulling angles or the absolute maximum/minimum for all possible nulling angles.

In some embodiments, the set of Doppler nulling angles (and hence the set of FSPs) includes at least three elements.

In some embodiments, the set of Doppler nulling angles is known to the Rx node, and the controller additionally generates frequency shift profiles by plotting the set of FSPs over the set of Doppler nulling angles. The controller further determines, based on the frequency shift profiles, additional parameters such as the directional component of the relative radial velocity vector and the angular direction of the Tx node relative to the Rx node.

In some embodiments, the additional parameters include a phase offset of the frequency shift profile.

In some embodiments, the angular direction includes a clock frequency offset between the Tx and Rx nodes, which the Rx node determines based on additional information received from the Tx node.

In some embodiments, the relative radial velocity vector is based in a platform inertial reference frame specific to the Rx node (e.g., a vector of the Tx node's movement relative to the Rx node). The Rx node may convert the relative radial velocity vector to a global inertial reference frame, e.g., to account for the motion of both the Tx and Rx nodes relative to the earth.

In some embodiments, the Rx node measures a time differential associated with each identified signal, e.g., a time differential in the measurement of one or more cycles of the received signal, the time differential corresponding to the Doppler frequency offset at the corresponding Doppler nulling angle.

In a further aspect, a method for direction and relative velocity determination between transmitting (Tx) and receiving (Rx) nodes in a multi-node communications network is also disclosed. In embodiments, the method includes identifying, via the Rx node, signals transmitted by a Tx node moving relative to the Rx node (e.g., according to a velocity vector and angular direction) and scanning through a range or set of Doppler nulling angles (e.g., nulling directions). Each signal may correspond to an adjustment of the transmitting frequency (e.g., corresponding to a net frequency shift detected by the Rx node) at a particular nulling direction to resolve the Doppler frequency offset associated with the motion of the Tx node relative to the Rx node. The method includes determining, based on the set of identified signals and corresponding set of net frequency shifts, a set of frequency shift points (FSP), each FSP corresponding to a particular nulling direction, to the net frequency shift at that direction, and to a radial velocity of the Tx node relative to the Rx node. The method includes determining, based on the set of FSPs, a magnitude of the radial velocity vector between the Tx and Rx nodes.

In some embodiments, the method includes determining a maximum and minimum relative velocity between the Tx and Rx nodes (e.g., which may be absolute or relative maxima and minima).

In some embodiments, the set of nulling angles is known to the Rx node, and the method includes mapping the set of FSPs to the set of nulling angles to generate frequency shift profiles. Based on the frequency shift profiles, the Rx node determines a directional component of the relative radial velocity vector and the angular direction associated with the motion of the Tx node relative to the Rx node.

In some embodiments, the method includes identifying a phase offset of the frequency shift profile.

In some embodiments, the method includes determining a clock frequency offset between the Tx and Rx nodes, the clock frequency offset incorporated into the angular direction and determined based on additional parameters received from the Tx node (e.g., via shifting scanning and monitoring roles between the Tx and Rx nodes).

In some embodiments, the method includes converting the relative radial velocity vector from a platform inertial reference frame specific to the Rx node to a global reference frame.

In some embodiments, the method includes measuring a time differential associated with each identified signal, e.g., a time differential in the measurement of one or more cycles of the received signal, the time differential corresponding to the Doppler frequency offset at the corresponding Doppler nulling angle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
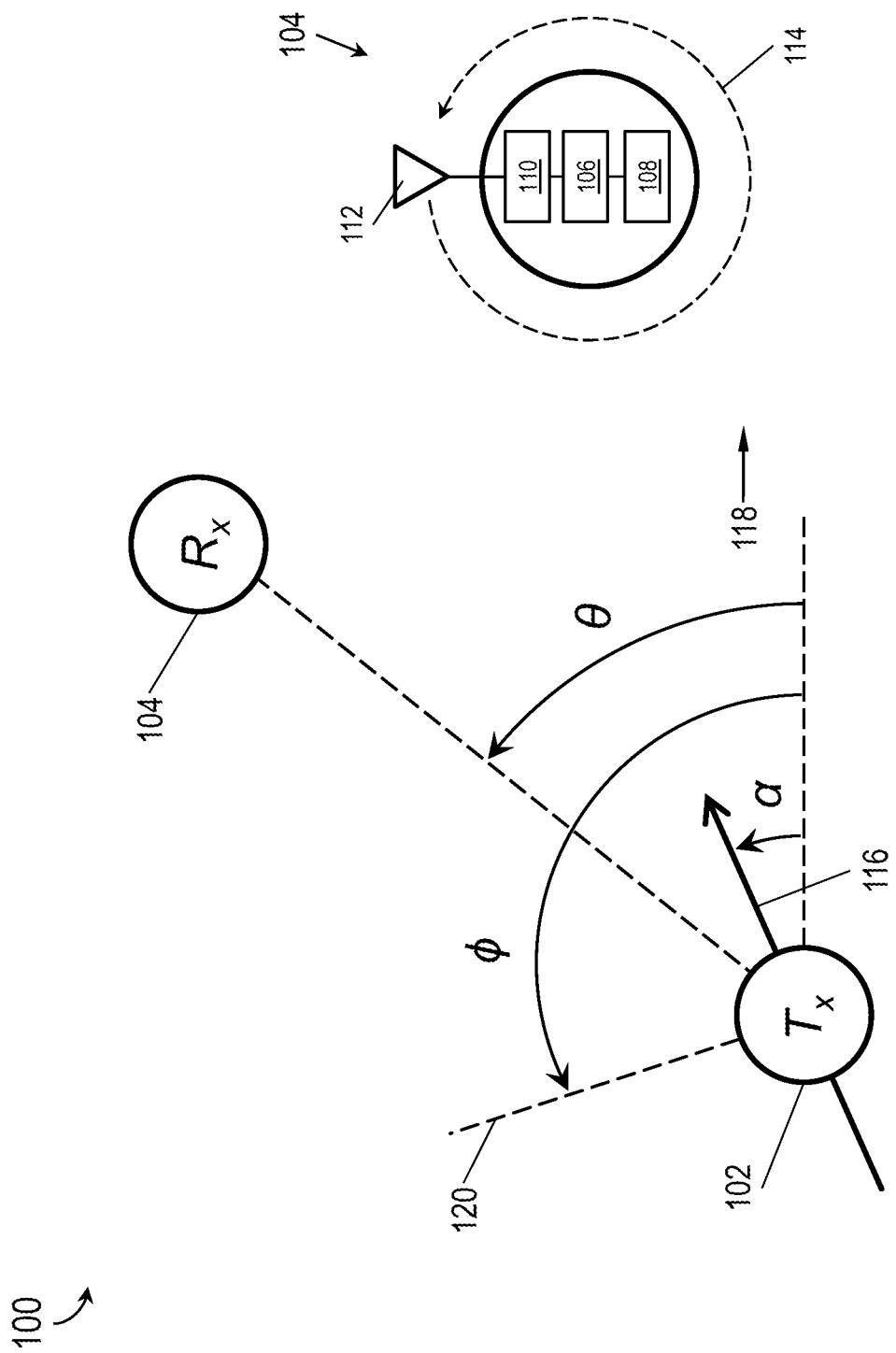
FIG. 1 is a diagrammatic illustration of a mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for determining relative velocity vectors, directions, and clock frequency offsets between mutually dynamic communication nodes of a mobile ad hoc network (MANET) or similar multi-node communications network. For example, via the use of omnidirectional antennas for Doppler null scanning (or, in some embodiments, directional antennas that require directional tracking via spatial scanning), directional topologies of neighbor nodes in highly dynamic network environments may be determined. Further, if Doppler null scanning knowledge is common to all nodes, receiving nodes may tune to the appropriate Doppler frequency shift to maintain full coherent sensitivity.

Referring to FIG. 1, a multi-node communications network 100 is disclosed. The multi-node communications network 100 may include multiple communications nodes, e.g., a transmitting (Tx) node 102 and a receiving (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets.

For example, the Tx and Rx nodes 102, 104 may include, but are not limited to, radios, mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104.

In embodiments, the Tx node 102 and Rx node 104 may both be moving in an arbitrary direction at an arbitrary speed, and may similarly be moving relative to each other. For example, the Tx node 102 may be moving relative to the Rx node 104 according to a velocity vector 116, at a relative velocity $V_{Tx}$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., a, $V_T$) and may adjust its transmitting frequency to remove the Doppler frequency shift at each Doppler nulling direction 120 and angle $\phi$.

In embodiments, even if the Doppler nulling protocol is not known to the Rx node 104, the Rx node may observe (e.g., monitor, measure) the net frequency offset as the Tx node 102 covers (e.g., steers to, orients to, directs antenna elements 112 to) a range of Doppler nulling directions 120 (e.g., relative to the arbitrary direction 118, each Doppler nulling direction 120 having a corresponding Doppler nulling angle $\phi$). Accordingly, the Rx node 104 may determine the magnitude of the parameter A of the velocity vector $\vec{V'_T}$ of the Tx node 102, to the degree that the Tx node covers both extremes (e.g., achieves both a minimum and a maximum velocity relative to the Rx node) such that $$A = \frac{f}{c}|\vec{V'_T}|$$

where f is the transmitting frequency of the Tx node and c is the speed of light. For example, each frequency shift point (FSP) detected by the Rx node 104 at a given Doppler nulling direction 120 may correspond to a velocity vector of the Tx node 102 relative to the Rx node. As noted above, and as described in greater detail below, the magnitude parameter A may incorporate a maximum and minimum relative velocity. If, however, the range of Doppler nulling angles $\phi$ is insufficiently broad, the magnitude parameter A may only include relative maxima and minima for that limited range of Doppler nulling angles (e.g., as opposed to the full 360 degrees of possible Doppler nulling angles; see, for example, FIGS. 2A-3B below).

In some embodiments, the Doppler nulling protocol and set of Doppler nulling directions 120 (and corresponding angles ϕ) may be known to the Rx node 104 and common to all other nodes of the multi-node communications network 100. For example, the Tx node 102 may perform the Doppler nulling protocol by pointing a Doppler null in each Doppler nulling direction 120 and angle ϕ of the set or range of directions as described above. The Rx node 104 may monitor the Tx node 102 as the Doppler nulling protocol is performed and may therefore determine, and resolve, the net Doppler frequency shift for each Doppler nulling direction 120 and angle ϕ.

In embodiments, although both the Tx and Rx nodes 102, 104 may be moving relative to the arbitrary direction 118, monitoring of the Doppler nulling protocol by the Rx node 104 may be performed and presented in the inertial reference frame of the Rx node 104 (e.g., in terms of the movement of the Tx node 102 relative to the Rx node 104) to eliminate the need for additional vector variables corresponding to the Rx node. For example, the velocity vector of the Tx node 102 in a global reference frame may be shifted according to the velocity vector of the Rx node 104, e.g.:

$$\vec{V'}_T = \vec{V}_T - \vec{V}_R$$

where $\vec{V'}_T$ is the velocity vector of the Tx node in the inertial reference frame of the Rx node and $\vec{V}_T$, $\vec{V}_R$ are respectively the velocity vectors of the Tx node and the Rx node in the Earth reference frame. In embodiments, either or both of the Tx node 102 and Rx node 104 may accordingly compensate for their own velocity vectors relative to the Earth and convert any relevant velocity vectors and relative velocity distributions into a global reference frame, e.g., for distribution throughout the multi-node communications network 100. In addition, while the representation of the relative motion between the Tx and Rx nodes 102, 104 is here presented in two dimensions, the relative motion (and, e.g., any associated velocity vectors, angular directions, Doppler nulling directions, and other parameters) may be presented in three dimensions with the addition of vertical/z-axis components.

Figure 2A:
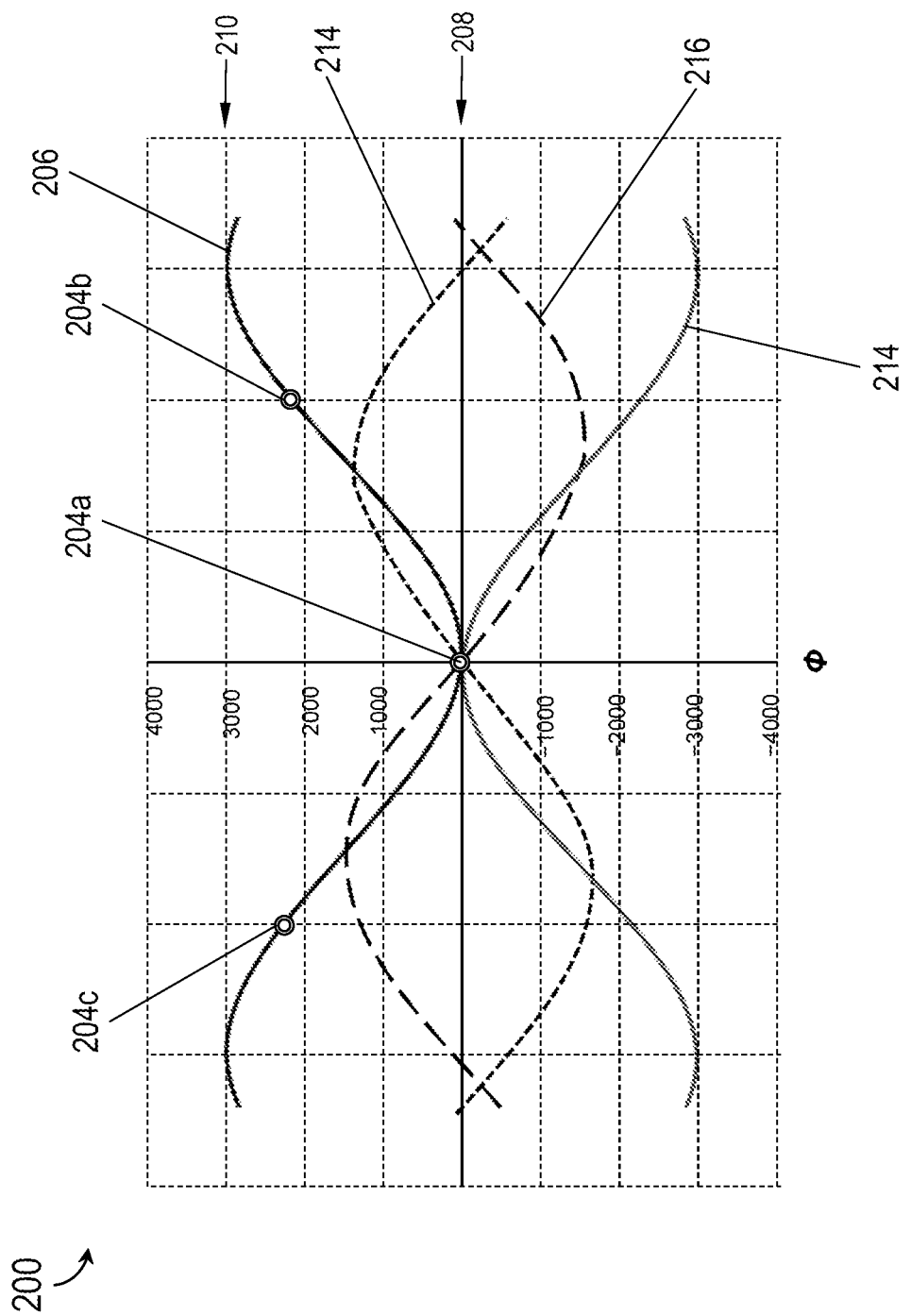
FIG. 2A is a graphical representation of frequency shift profiles within the MANET of FIG. 1.
Figure 2B:
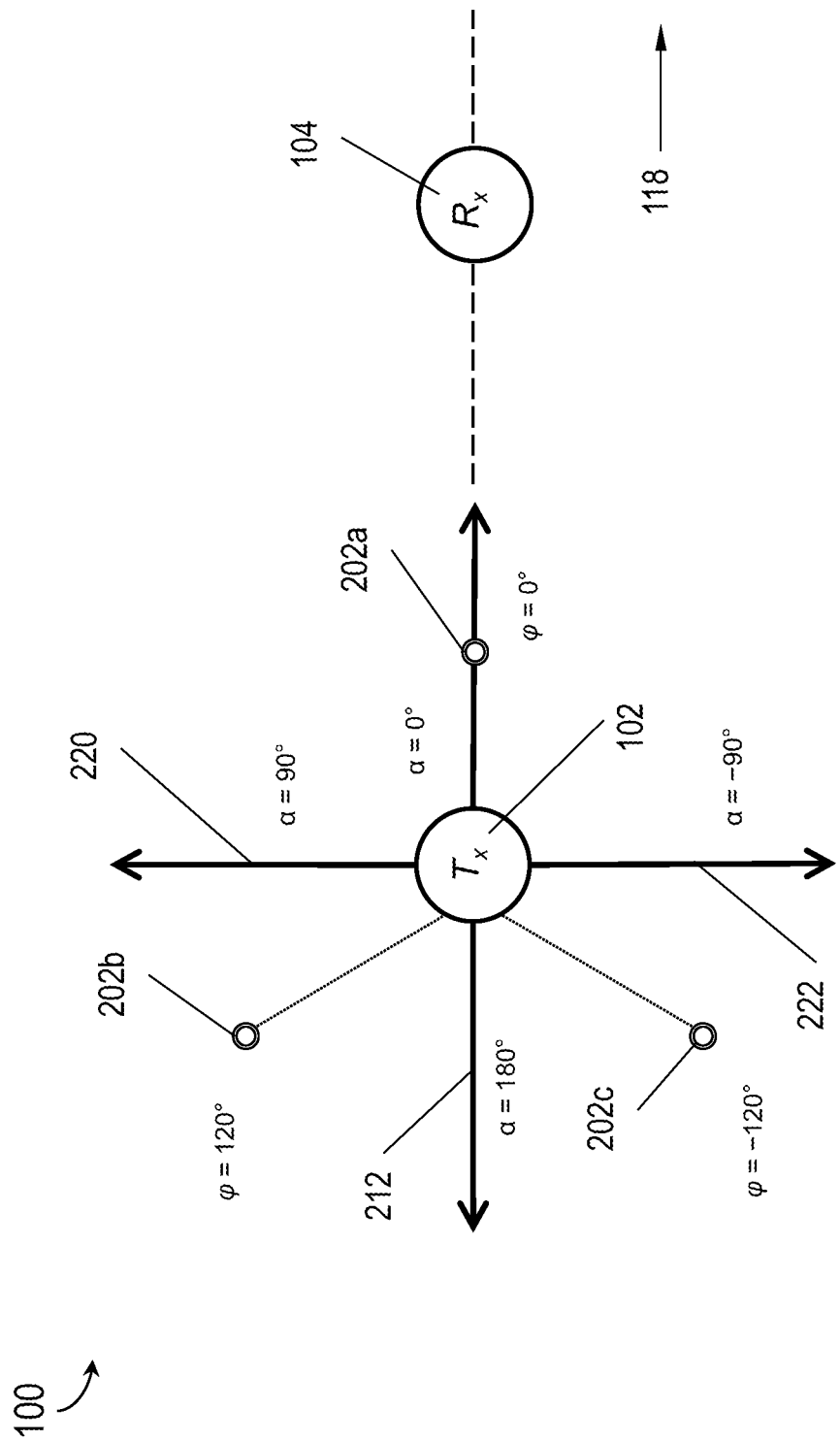
FIG. 2B is a diagrammatic illustration of varying directional components a of the velocity vector of a transmitting node Tx with respect to the graphical representation of FIG. 2A.

Referring now to FIGS. 2A and 2B, the graph 200 and multi-node communication network 100 are respectively shown. The graph 200 may plot frequency shift profiles for varying directional components (α, FIG. 2B) of the velocity vector of the Tx node (102, FIG. 2B) relative to the Rx node (104, FIG. 2B) for multiple Doppler nulling directions (120, FIG. 1) and angles ϕ (e.g., relative to the arbitrary direction (118, FIG. 2B)) and velocity $V_{Tx}$ of the Tx node. In the interest of clarity, the graph 200 and other plots of frequency shift profiles provided below may be scaled by c/f to eliminate the ratio f/c (where, as noted above, f is the transmitting frequency of the Tx node 102 and c is the speed of light).

In embodiments, the Rx node 104 may repeat the net Doppler frequency shift determination and resolution process for multiple Doppler nulling directions 120 and angles ϕ of the Tx node 102 (e.g., chosen at random or according to predetermined or preprogrammed protocol). For example, the Tx node 102 may scan through at least three Doppler nulling directions (202a-c, FIG. 2B)/angles ϕ and map, via the corresponding frequency shift points, the distribution of the dependent Doppler frequency shift for each Doppler nulling direction and angle ϕ. The graph 200 may plot frequency shift profiles for varying directional components a relative to the arbitrary direction 118 assuming the angular direction θ=0 (e.g., consistent with an Rx node 104 moving due east) and velocity $V_{Tx}$ of the Tx node 102=1500 m/s. As it is well known that the Doppler frequency shift is a sinusoidal distribution relative to the angle ϕ of the Doppler nulling directions 202a-c, measurements at multiple Doppler nulling directions of the Tx node 102 by the Rx node 104 may generate frequency shift points (204a-c, FIG. 2A) to which a frequency shift profile 206 may be mapped as a sinusoidal curve showing the distribution of relative velocity between the Tx and Rx nodes 102, 104 through the full range of Doppler nulling angles ϕ (e.g., assuming the maximum and minimum relative velocities are included).

In embodiments, the amplitude of the frequency shift profile 206 may correspond to the velocity of the Tx node 102 relative to the Rx node 104. For example, even if the Doppler nulling protocol is not known to the Rx node 104, a magnitude parameter A of the velocity vector $\vec{V'}_T$ of the Tx node 102 (e.g., in the reference frame of the Rx node) may still be determined, e.g., between a minimum relative velocity 208 (e.g., 0 m/s) and a maximum relative velocity 210 (e.g., 3000 m/s, or consistent with Tx and Rx nodes traveling in opposing directions (α=180°, consistent with a Tx node traveling due west (212) and the phase-offset frequency shift profile 214).

In embodiments, as a varies the frequency shift profiles 214, 216, 218 may present as phase-offset versions of the frequency shift profile 206 (e.g., with similarly offset maximum and minimum relative velocities). For example (in addition to the frequency shift profile 214 noted above), the frequency shift profile 216 may correspond to α=90°, consistent with a Tx node traveling due north (220) and the frequency shift profile 218 may correspond to α=−90°, consistent with a Tx node traveling due south (222).

In embodiments, the frequency shift profiles 206, 214, 216, 218 may allow the Rx node 104 to derive parameters in addition to the magnitude parameter A of the velocity vector $\vec{V'}_T$ of the Tx node 102. For example, the true Doppler frequency shift due to the relative radial velocity between the Tx and Rx nodes 102, 104 may be, as seen by the Rx node:

$$\Delta f'_{Doppler} = \frac{f}{c}|\vec{V'}_T|\cos(\theta - \alpha)$$

and the Tx node 102 may, per the Doppler nulling protocol, adjust the transmitting frequency f due to its velocity projection at the Doppler nulling angle ϕ such that:

$$\Delta f_{Pr} = -\frac{f}{c}|\vec{V'}_T|\cos(\varphi - \alpha)$$

and the net Doppler frequency shift, also accounting for clock frequency offset $\Delta f_{clock}$, may therefore be:

$$\Delta f_{net} = \frac{f}{c}|\vec{V'}_T|[\cos(\theta - \alpha) - \cos(\varphi - \alpha)] + \Delta f_{clock}$$

assuming, for example, that the velocity vector and direction change slowly relative to periodic measurements of $\Delta f_{net}$. It should be noted that $\Delta f_{net}$ as presented above represents a net frequency offset from nominal incorporating f/C (compare, e.g., FIGS. 2A-B and accompanying text above). Under these conditions, from the perspective of the Rx node 104 the parameters α, $T_x$, and θ may be taken as constants, and the net frequency offset $\Delta f_{net}$ may also be expressed as:

$$\Delta f_{net} = A \cos(\varphi + B) + C$$

where the constant parameters A, B, and C may be determined via at least three measurements of a Doppler nulling angle φ. As noted above, $$A = \frac{f}{c}|\vec{V_T'}|$$

while also $$B = \pi - \alpha$$

and $$C = \frac{f}{c}|\vec{V_T'}|\cos(\theta - \alpha) + \Delta f_{clock}$$

where, as noted above, A may correspond to the magnitude of the velocity vector of the Tx node 102 relative to the Rx node 104. Similarly, B may correspond to the directional component α of the velocity vector and C to the angular direction θ of the Rx node 104.

In embodiments, once the parameters A, B, and C are determined, the parameters α, $V'_T$, θ, may be derived therefrom as can be seen above. For example, when the clock frequency offset $\Delta f_{clock}$ is zero it is straightforward to derive θ from C above. However, when the clock frequency offset $\Delta f_{clock}$ is nonzero, the Rx node 104 may determine $\Delta f_{clock}$ by exchanging information with the Tx node 102. For example, the Rx and Tx nodes 104, 102 may switch roles: the Rx node 104 may perform the Doppler nulling protocol for various Doppler nulling directions 120 and angles φ while the Tx node 102 monitors the Doppler nulling protocol to resolve the net Doppler frequency shift for θ'=θ+π (and $\Delta f'_{clock} = -\Delta f_{clock}$). The Tx node 102 may share this information with the Rx node 104, which may merge information from both directions to determine θ and $\Delta f_{clock}$.

Figure 3A:
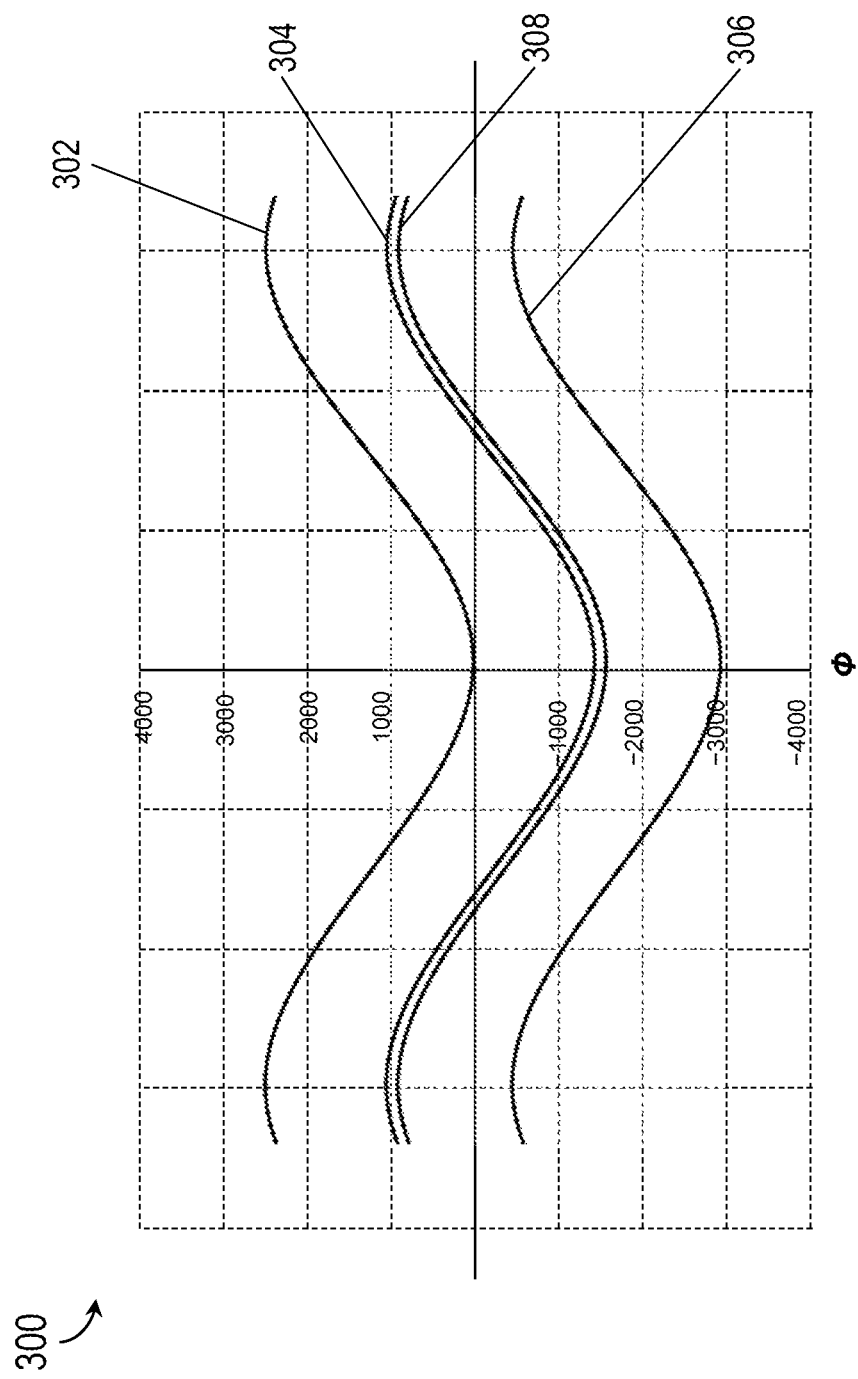
FIG. 3A is a graphical representation of frequency shift profiles within the MANET of FIG. 1.
Figure 3B:
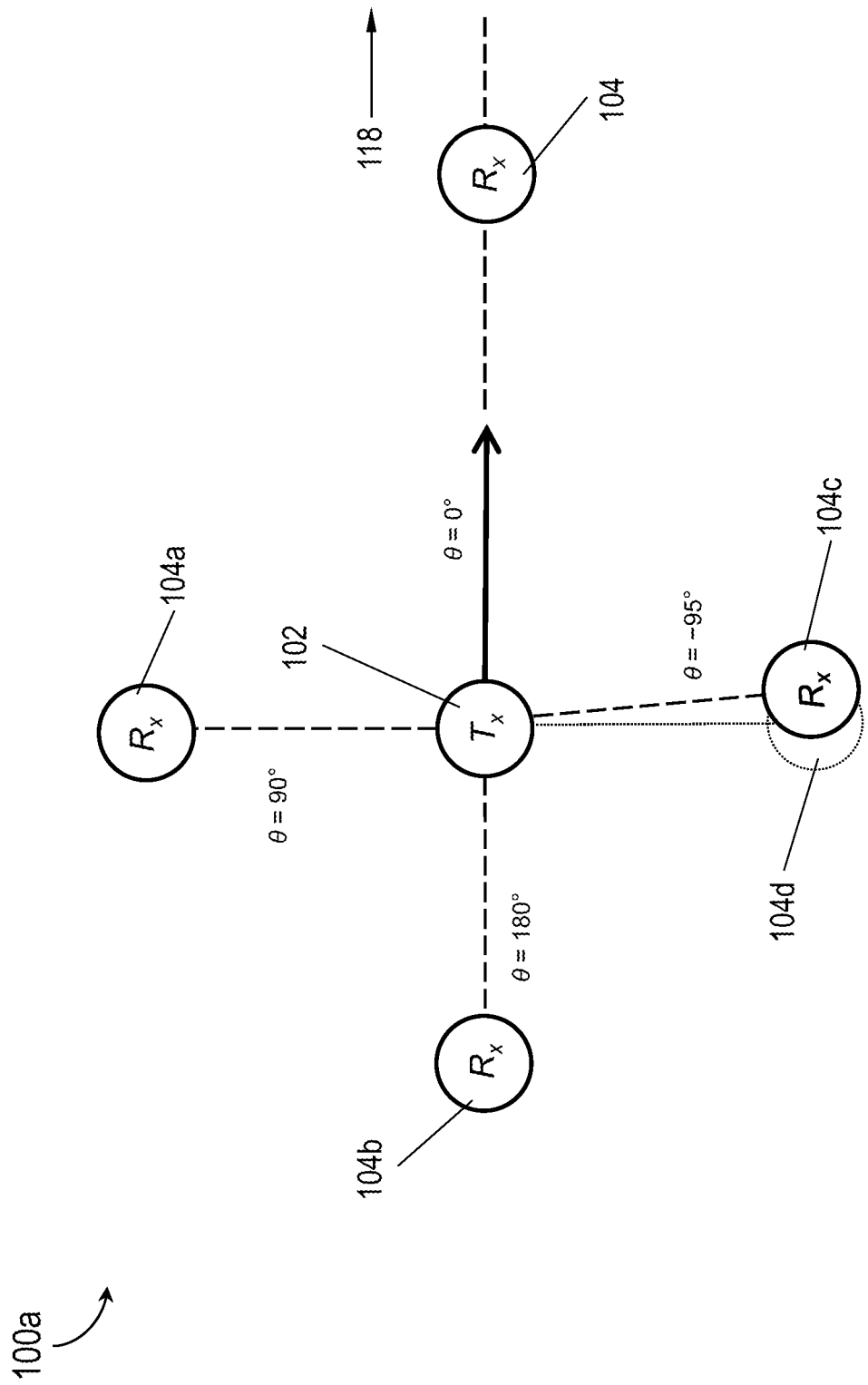
FIG. 3B is a diagrammatic illustration of varying angular directions θ of a receiving node Rx with respect to the graphical representation of FIG. 3A.

Referring now to FIGS. 3A and 3B, the graph 300 and multi-node communication network 100a may be implemented and may function similarly to the graph 200 and multi-node communication network 100 of FIGS. 2A and 2B, except that the graph 300 and multi-node communication network 100a may reflect a consistent zero directional component α (e.g., a Tx node (102, FIG. 3B) moving in or parallel to the arbitrary direction (118, FIG. 3B, e.g., due east)) and variable angular directions θ of the Rx node (104, 104a-c, FIG. 3B) relative to the Tx node.

In embodiments, the frequency profiles (302, 304, 306, 308; FIG. 3A) may respectively be associated with θ=0° (e.g., consistent with the Rx node 104 lying directly in the path of the Tx node 102); θ=90° (Rx node 104a); θ=180° (Rx node 104b, consistent with the Tx node moving in the opposing direction from the Rx node (e.g., an Rx node moving due west)); and θ=-95° (Rx node 104c). Referring in particular to FIG. 3A, the frequency profiles 302-308 may be shifted in amplitude (rather than in phase, as shown by the graph 200 of FIG. 2A) such that the Doppler frequency shift varies only in magnitude (e.g., relative maximum and minimum velocities). It may be noted that the frequency shift profile 304 (θ=90°) appears identical to the frequency shift profile associated with θ=−90° (Rx node 104d), where both angular directions θ are perpendicular to the velocity vector of the Tx node 102 (directional component α) but mutually opposed. If, for example, an Rx node 104a, 104d communication node enters the multi-node communication network 100a at such a position and velocity, a one-time determination may have to be made by other means (e.g., or by waiting for a change in Rx node velocity or in θ to precisely determine θ (e.g.,+90°/−90°, after which determination the precise θ can be tracked without ambiguity.

In some embodiments, the Rx node 104, 104a-c may assess and determine Doppler effects due to the relative motion of the Tx node 102 by measuring time differential points (TDP) rather than FSPs. For example, a signal transmitted at 1 kHz by the Tx node 102 may be subject to 10 Hz of Doppler frequency shift. This one-percent (1%) change in frequency may be alternatively expressed as a differential of one percent in the time required to measure a cycle of the transmitted signal (or, e.g., any arbitrary number of cycles). The Doppler effect may be precisely and equivalently characterized in either the frequency domain or the time domain. For example, the graphs 200, 300 of FIGS. 2A and 3A, which plot the velocity vector of the Tx node 102 relative to the Rx node 104, 104a-c (y-axis) against the Doppler nulling angle φ, may remain consistent between the frequency domain and the time domain, with the exception that each FSP (204a-c, FIG. 2A) corresponds to a measured time differential at a given Doppler nulling angle φ(e.g., to a TDP) rather than to a measured frequency shift at that nulling angle.

In some embodiments, due to the nature of the transmitted signal (or, e.g., other conditions) it may be easier or more advantageous for the Rx node 104 to determine the Doppler shift in the time domain rather than in the frequency domain. For example, when the signal transmitted by the Tx node 102 at a given Doppler nulling direction (202a-c, FIG. 2B) consists of a series of short pulses and a long pulse repetition interval (e.g., as opposed to, e.g., a continuous short-duration pulse), the Rx node 104 may instead determine the Doppler shift to be resolved by measuring the time differential between received cycles of the transmitted signal and generating time differential profiles based on each determined set of TDPs. As the resulting time differential profiles plot the relative velocity vector of the Tx node 102 over a set of Doppler nulling angles φ similarly to the frequency shift profile graphs 200, 300, of FIGS. 2A and 3A, the same information can be determined by the Rx node 104.

Figure 4A:
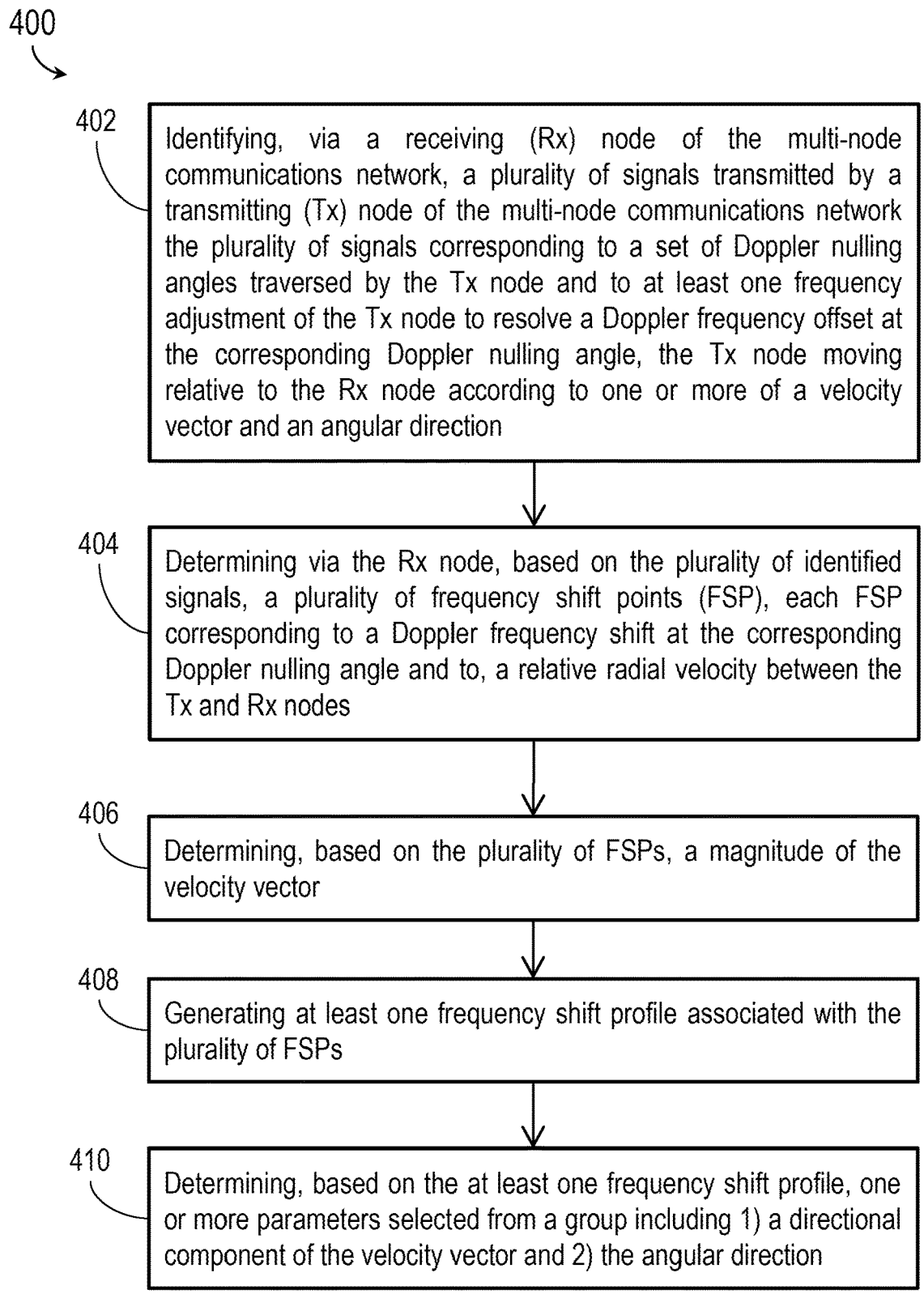
FIGS. 4A through 4C are flow diagrams illustrating a method for Doppler frequency offset determination according to example embodiments of this disclosure.
Figure 4B:
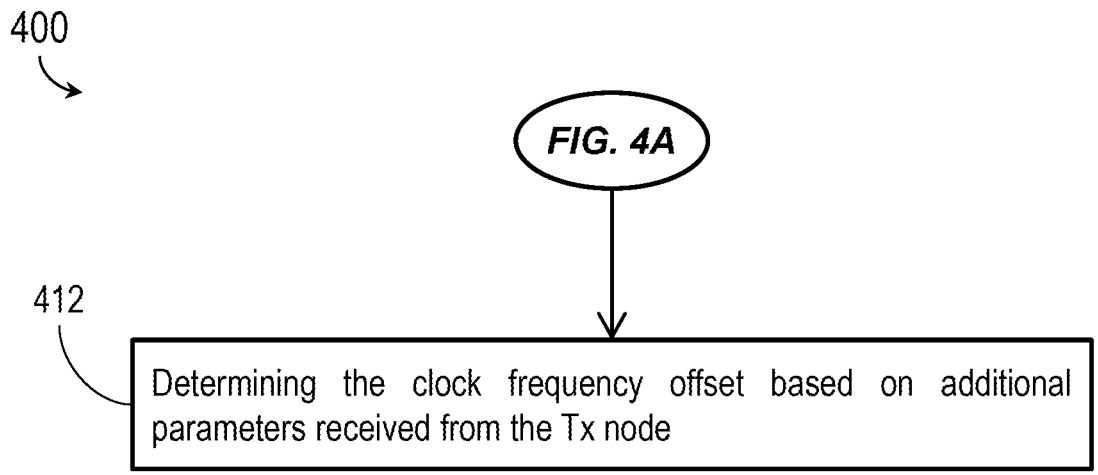
Figure 4C:
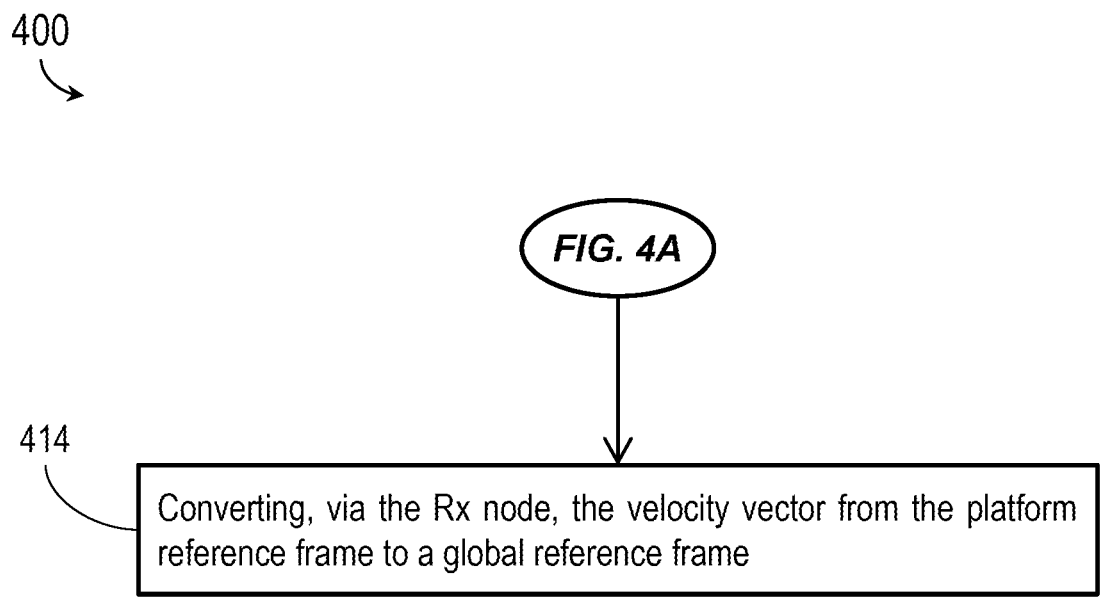

FIGS. 4A-C—Method

Referring now to FIG. 4A, the method 400 may be implemented by the multi-node communications networks 100, 100a and may include the following steps.

At a step 402, a receiving (Rx) node of the multi-node communications network monitors a transmitting (Tx) node of the network to identify signals transmitted by the Tx node through a range of Doppler nulling angles (e.g., or a set of discrete Doppler nulling angles), the signals including adjustments to the transmitting frequency to counter Doppler frequency offset at each Doppler nulling angle. For example, the Tx node may be moving relative to the Rx node according to a velocity vector and an angular direction. Each identified signal may correspond to a particular Tx frequency adjustment (e.g., a net frequency shift detected by the Rx node) at a particular Doppler nulling angle to resolve a Doppler frequency offset at that angle.

At a step 404, a controller of the Rx node determines, based on the monitoring and identified signals, a set (e.g., three or more) of frequency shift points (FSP), where each FSP corresponds to a net frequency shift of the signal. For example, each FSP may correspond to the Tx node (e.g., aware of its velocity vector and platform orientation) scanning in a Doppler nulling direction and adjusting its transmit frequency to resolve the Doppler offset at the corresponding Doppler nulling angle φ according to a nulling protocol, resulting in the net frequency shift detected by the Rx node. In some embodiments, the Rx node measures the net frequency shift in the time domain rather than in the frequency domain. For example, the Rx node may measure a time differential associated with a received cycle or cycles of the identified signal, the time differential corresponding to the net frequency shift at the corresponding Doppler nulling angle.

At a step 406, the controller determines, based on the plurality of frequency shift points, a magnitude of the relative velocity vector between the Tx and Rx nodes (e.g., in the reference frame of the Rx node). For example, from the magnitude of the velocity can be derived a maximum and minimum relative velocity with respect to the range of Doppler nulling angles φ.

In some embodiments, the range or set of Doppler nulling angles φ may be known to all nodes of the multi-node communications network (e.g., including the Rx node) and the method 400 may include the additional steps 408 and 410.

At the step 408, the Rx node maps the determined FSPs to a frequency shift profile corresponding to a distribution (e.g., a sinusoidal curve) of the φ-dependent net frequency shift over all possible Doppler nulling angles φ. In some embodiments, the controller further determines a phase offset of the frequency shift profile.

At the step 410, the controller determines, based on the frequency shift profile, a velocity $V'_T$ and a directional component α of the velocity vector (e.g., of the Tx node 102 relative to an arbitrary direction) and the angular direction θ (e.g., of the Rx node relative to the arbitrary direction).

Referring also to FIG. 4B, the method 400 may include an additional step 412. At the step 412, the angular direction θ incorporates a clock frequency offset between the Tx and Rx nodes, which the Rx node determines based on additional information received from the Tx node.

Referring now to FIG. 4C, the method 400 may include an additional step 414. At the step 414, the velocity vector may be in an inertial reference frame specific to the Rx node. For example, the Rx node may convert the velocity vector from its own platform reference frame to a global reference frame.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communications node of a multi-node communications network, comprising:
    a communications interface including at least one antenna element;
    a controller operatively coupled to the communications interface, the controller including one or more processors and configured to:
        identify a plurality of signals transmitted by a neighbor node of the communications node, the plurality of signals corresponding to a set of Doppler nulling angles traversed by the neighbor node and to at least one frequency adjustment of the neighbor node to resolve a Doppler frequency offset at the corresponding Doppler nulling angle, the neighbor node moving relative to the communications node according to one or more of a velocity vector and an angular direction;
        determine, based on the plurality of identified signals, a plurality of frequency shift points (FSP), each FSP corresponding to the Doppler frequency offset at the corresponding Doppler nulling angle and associated with a relative radial velocity between the communications and neighbor nodes;
        and
        determine, based on the plurality of FSPs, a magnitude of the velocity vector.

2. The communications node of claim 1, wherein the magnitude of the velocity vector includes one or more of a maximum relative velocity and a minimum relative velocity between the communications and neighbor nodes.

3. The communications node of claim 1, wherein the plurality of FSPs includes at least three FSPs.

4. The communications node of claim 1, wherein:
    the set of Doppler nulling angles is known to the neighbor and communications nodes;
    and
    the controller is configured to:
        generating at least one frequency shift profile plotting the plurality of FSPs over the set of Doppler nulling angles;
        and
        determining, based on the at least one frequency shift profile, one or more parameters selected from a group including:
            a directional component of the velocity vector;
            and
            the angular direction.

5. The communications node of claim 4, wherein the one or more parameters are associated with a phase offset of the at least one frequency shift profile.

6. The communications node of claim 4, wherein:
    the angular direction includes a clock frequency offset;
    and
    the controller is configured to determine the clock frequency offset based on additional parameters received from the neighbor node.

7. The communications node of claim 1, wherein:
    the velocity vector is associated with a platform reference frame of the communications node;
    and the controller is configured to convert the velocity vector from the platform reference frame to a global reference frame.

8. The communications node of claim 1, wherein:
the controller is configured to determine each FSP by measuring a time differential associated with each identified signal, the time differential corresponding to the Doppler frequency offset at the corresponding Doppler nulling angle.

9. A method for neighbor-node direction and relative velocity determination in a multi-node communications network, the method comprising:
identifying, via a receiving (Rx) node of the multi-node communications network, a plurality of signals transmitted by a transmitting (Tx) node of the multi-node communications network the plurality of signals corresponding to a set of Doppler nulling angles traversed by the Tx node and to at least one frequency adjustment of the Tx node to resolve a Doppler frequency offset at the corresponding Doppler nulling angle, the Tx node moving relative to the Rx node according to one or more of a velocity vector and an angular direction;
determining via the Rx node, based on the plurality of identified signals, a plurality of frequency shift points (FSP), each FSP corresponding to a Doppler frequency shift at the corresponding Doppler nulling angle and to a relative radial velocity between the Tx and Rx nodes; and
determining, based on the plurality of FSPs, a magnitude of the velocity vector.

10. The method of claim 9, wherein determining, based on the plurality of frequency shift points, a magnitude of the velocity vector includes:
determining one or more of a maximum relative velocity and a minimum relative velocity of the Tx node.

11. The method of claim 9, wherein the at least one Doppler nulling angle is known to the Tx and Rx nodes, further comprising:
generating at least one frequency shift profile plotting the plurality of FSPs over the set of Doppler nulling angles; and
determining, based on the at least one frequency shift profile, one or more parameters selected from a group including:
a directional component of the velocity vector; and
the angular direction.

12. The method of claim 11, wherein generating at least one frequency shift profile plotting the plurality of FSPs over the set of Doppler nulling angles includes:
identifying a phase offset associated with the at least one frequency shift profile.

13. The method of claim 11, wherein the angular direction includes a clock frequency offset, further comprising:
determining the clock frequency offset based on additional parameters received from the Tx node.

14. The method of claim 9, wherein the velocity vector is associated with a platform reference frame of the Rx node, further comprising:
converting, via the Rx node, the velocity vector from the platform reference frame to a global reference frame.

15. The method of claim 9, wherein determining via the Rx node, based on the plurality of identified signals, a plurality of frequency shift points (FSP) includes:
measuring a time differential associated with each identified signal, each time differential corresponding to the Doppler frequency offset at the corresponding Doppler nulling angle.

* * * * *